United States Patent [19]

Aldinger

[11] Patent Number: 5,163,882
[45] Date of Patent: Nov. 17, 1992

[54] VARIABLE SPEED DRIVE CONVERSION FOR BRIDGEPORT SERIES ONE VERTICAL MILLING MACHINE

[75] Inventor: Danny L. Aldinger, Irvine, Calif.
[73] Assignee: Sterling Electric, Inc., Irvine, Calif.
[21] Appl. No.: 771,122
[22] Filed: Oct. 2, 1991
[51] Int. Cl.⁵ ............................................. F16H 7/00
[52] U.S. Cl. .................................... 474/84; 474/86
[58] Field of Search .......................... 474/84–89; 409/64

[56] References Cited

U.S. PATENT DOCUMENTS

| | | |
|---|---|---|
| 1,985,688 | 12/1934 | Parsons . |
| 2,008,983 | 7/1935 | Kearney . |
| 2,033,749 | 3/1936 | Walter . |
| 2,085,888 | 7/1937 | Armitage . |
| 2,382,934 | 8/1945 | Armitage . |
| 2,437,850 | 5/1948 | Dennis ............................ 474/86 X |
| 2,610,532 | 9/1952 | Heppenstall ..................... 474/86 X |
| 2,618,202 | 11/1952 | Eserkaln . |
| 3,884,421 | 5/1975 | Fullalove et al. ................ 474/86 X |

OTHER PUBLICATIONS

Variable Speed Drives, Brochure of Sterling Electric, Inc.

Primary Examiner—Thuy M. Bui
Attorney, Agent, or Firm—Stetina and Brunda

[57] ABSTRACT

The present invention relates to a method of retrofitting a Bridgeport Series One vertical milling machine with a variable speed drive unit. The method generally comprises the removal of a drive motor and stepped pulley attached thereto from the pulley housing of the Series One milling machine. The drive motor and stepped pulley are replaced with a variable speed drive unit comprising a drive housing which is attached to the pulley housing via a flange member formed on the bottom surface thereof. The flange member is specifically configured to be easily retrofittable to the existing aperture defined within the pulley housing by the removal of the drive motor therefrom.

5 Claims, 1 Drawing Sheet

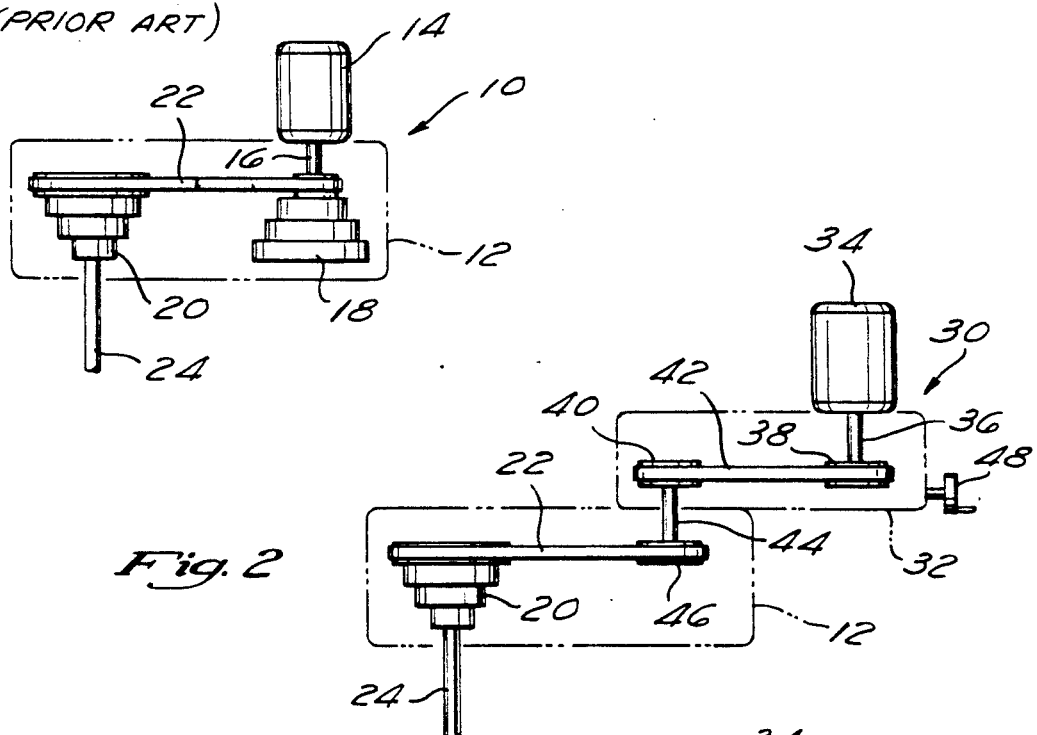
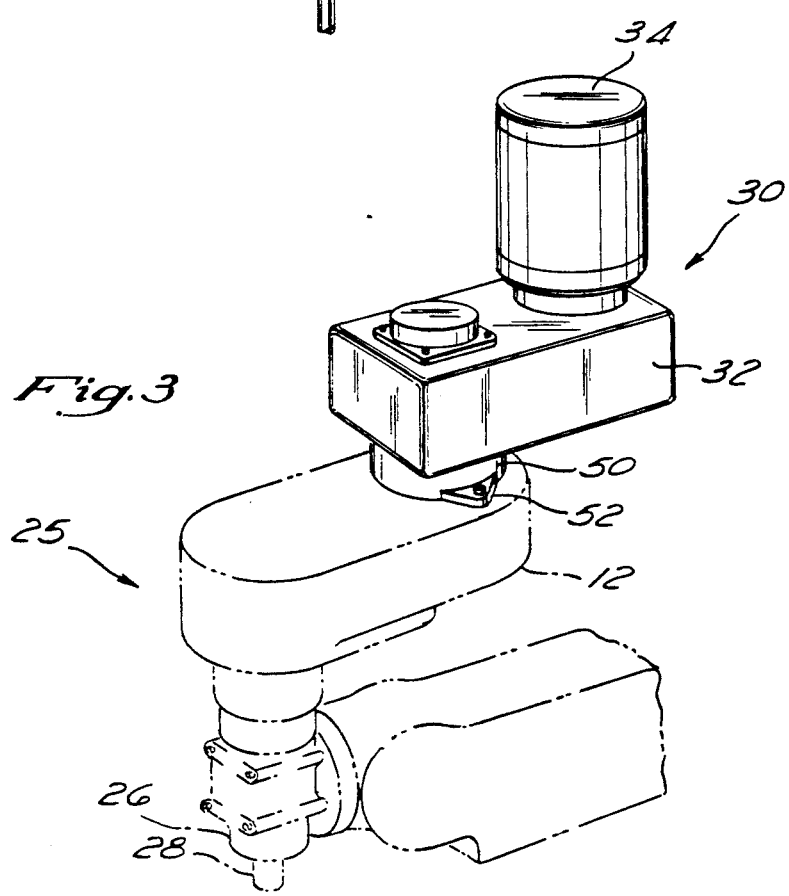

VARIABLE SPEED DRIVE CONVERSION FOR BRIDGEPORT SERIES ONE VERTICAL MILLING MACHINE

FIELD OF THE INVENTION

The present invention relates generally to milling equipment, and more particularly to a method of retrofitting a Bridgeport Series One vertical milling machine with a variable speed control drive unit to permit rapid and infinite adjustment of the rotational speed of the milling machine tool spindle.

BACKGROUND OF THE INVENTION

A well-known piece of machine shop equipment is the Bridgeport Series One vertical milling machine which has been in the marketplace since the 1930's. The tool spindle of the Series One milling machine, to which an end mill is typically mounted for cutting tool applications, is driven by a motor which is interfaced to a pair of pulleys having stepped configurations wherein each pulley defines four (4) annular surfaces of different diameter. Particularly, the Series One comprises a pulley housing which includes a drive motor connected thereto. A drive shaft extends downwardly from the drive motor into the pulley housing and includes a first stepped pulley attached to the distal end thereof which is disposed within the pulley housing. The tool spindle, which extends downwardly from the pulley housing, includes a second stepped pulley attached to the end thereof disposed within the housing. As such, the second stepped pulley is also disposed within the pulley housing. The first and second stepped pulleys are interfaced to one another via a V-belt which extends between corresponding, i.e. horizontally aligned, pairs of annular surfaces of each of the pulleys. Since each of the stepped pulleys defines four (4) differently dimensioned annular surfaces, the Series One is capable of achieving four (4) distinct rotational speeds, with each speed being dependent upon the vertical position of the V-belt. Thus, when it is desired to adjust the rotationable speed of the tool spindle, it is necessary to manually reposition the V-belt upon the first and second stepped pulleys. In many instances, the discreet speeds obtainable with the Series One are inappropriate for desired end mill cutting applications. Additionally, the requirement to manually reposition the V-belt upon the stepped pulleys is time consuming.

Though many modern milling machines are provided with variable speed drives, large numbers of the Bridgeport Series One milling machine are still in operation and do not possess the variable speed capacity of the modern milling machines. The present invention addresses the deficiencies associated with Bridgeport Series One vertical milling machines relating to the adjustment of the rotational speed of the tool spindle.

SUMMARY OF THE INVENTION

In accordance with the preferred embodiment of the present invention, there is provided a method for retrofitting a Bridgeport Series One vertical milling machine with a variable speed drive. The method generally comprises the step of removing the drive motor and first pulley from within the existing pulley housing of the Series One milling machine. The drive housing of a variable speed drive unit is then attached to the pulley housing in manner wherein an output shaft of the variable speed drive extends downwardly from the drive housing into the pulley housing. The variable speed drive includes a drive pulley which is attached to the distal end of the output shaft and is therefore disposed within the pulley housing when the drive housing is attached thereto. The drive pulley disposed within the pulley housing is then connected to the preexisting second pulley which is also disposed within the pulley housing via a V-belt. Particularly, the V-belt is used to connect the drive pulley to the uppermost one of the annular surfaces defined by the second stepped pulley. The preferred method further comprises the step of forming a flange upon the drive housing wherein the flange is specifically sized and configured to be quickly and easily retrofittable to the pulley housing of the Series One milling machine.

The preferred drive unit includes a motor and a belt-driven variable speed drive comprising a pair of pulleys. The output shaft is interfaced to one of the pulleys of the variable speed drive and, as previously indicated, is provided with a drive pulley on the distal end thereof which is disposed within the pulley housing and connected via the V-belt to the uppermost annular surface defined by the second stepped pulley. The variable speed drive unit further includes a hand wheel extending therefrom which allows infinite speed adjustment of the output shaft with a constant motor rotation. As such, by selectively rotating the hand wheel, infinite adjustment of the rotational speed of the tool spindle is facilitated without the need for repositioning the V-belt within the pulley housing.

BRIEF DESCRIPTION OF THE DRAWINGS

These and other features of the present invention will become more apparent upon reference to the drawings wherein:

FIG. 1 is a side elevational view of the pulley housing and associated components of a prior art Bridgeport Series One vertical milling machine;

FIG. 2 is a side elevational view illustrating the interface of a variable speed drive unit to the pulley housing of a prior art Bridgeport Series One vertical milling machine; and FIG. 3 is a perspective view illustrating the prior art Bridgeport Series One vertical milling machine (shown in phantom) having a variable speed drive unit retrofitted thereto.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 illustrates a drive unit 10 as configured in a prior art Bridgeport Series One vertical milling machine. Drive unit 10 generally comprises a pulley housing 12 (shown in phantom) having a drive motor 14 attached thereto. Attached to and extended downwardly from drive motor 14 is a drive shaft 16 which extends into the pulley housing 12. Attached to the distal end of drive shaft 16 is a first stepped pulley 18 defining four (4) annular surfaces of increasing diameter. Also disposed within pulley housing 12 is a second stepped pulley 20 which also defines four (4) annular surfaces of increasing diameter. In the prior art Bridgeport Series One vertical milling machine, corresponding, i e. horizontally aligned, pairs of the annular surfaces of first stepped pulley 18 and second stepped pulley 20 are selectively interconnectable via a V-belt 22. As will be recognized, since the first stepped pulley 18 and second stepped pulley 20 each define only four (4) differently dimensioned annular surfaces, the Series One is capable of achieving only four distinct rotational speeds. In this respect, each rotational speed corresponds to the position of the V-belt 22 upon one of the four pairs of horizontally aligned annular surfaces. Attached to and extending downwardly from the second stepped pulley 20 is a tool spindle 24.

Referring now to FIG. 3, the tool spindle 24 extends out of the pulley housing 12 and into a chuck 26 of the Series One milling machine 25. The tool spindle 24 is cooperatively engaged to a cutting tool such as an end mill 28 which is typically interfaced thereto via a collet (not shown) inserted into the chuck 26. In operation, rotation of the tool spindle 24 via the drive motor 14 causes the simultaneous rotation of the end mill 28. As previously specified, due to the configuration of the first and second stepped pulleys 18 and 20 and the extension of the V-belt 22 therebetween, the prior art Bridgeport Series One vertical milling machine is able to achieve only four distinct rotational speeds of the tool spindle 24 which are directly dependant upon the vertical positioning of the V-belt 22. Thus, when it is desired to adjust the rotational speed of the tool spindle 24 to a different one of the four obtainable settings, it is necessary to manually reposition the V-belt 22 upon the stepped pulleys 18 and 20. Often times, the four obtainable speeds in the prior art series one vertical milling machine are inappropriate for the desired cutting application. Additionally, the requirement of having to manually reposition the V-belt 22 upon the stepped pulleys 18 and 20 to facilitate a speed adjustment is time consuming.

Referring now to FIGS. 2 and 3, a variable speed drive unit 30 is shown as being retrofitted to the pulley housing 12 of the milling machine 25. Drive unit 30 generally comprises a drive housing 32 having a motor 34 attached thereto. Extending downwardly from motor 34 into drive housing 32 is a second drive shaft 36. Attached to the distal end of second drive shaft 36 is a first pulley 38 which is disposed within the drive housing 32. Also disposed within the drive housing 32 is a second pulley 40 which is interfaced to the first pulley 38 via a drive belt 42. Importantly, first pulley 38, second pulley 40 and drive belt 42 provide the drive unit 30 with its variable speed capacity. Attached to and extending downwardly from second pulley 40 is a transmission shaft 44 which extends out of drive housing 32 into pulley housing 12. Disposed on the end of transmission shaft 44 opposite that interfaced to second pulley 40 is a drive pulley 46. The manner in which drive pulley 46 is interfaced to the existing components of the Bridgeport Series One vertical milling machine will be discussed in greater detail below. Extending outwardly from one side of the drive housing 32 is a hand wheel 48. The hand wheel 48 is adapted to allow infinite speed adjustment of the transmission shaft 44 with a constant rotation of the motor 34. As such, by selectively rotating the hand wheel 48, infinite adjustment of the rotational speed of the transmission shaft 44 is facilitated without the necessity of having to manually reposition the drive belt 42 upon the pulleys 38 and 40 within the drive housing 32.

In the preferred embodiment, the variable speed drive unit 30 is preferably a Model No. BP7EID or BP1EID drive unit manufactured by STERLING ELECTRIC, INC., of Irvine, Calif. The drive housing 32 is constructed so as to be totally enclosed. The motor 34 is preferably a 230/460 VAC, 3 phase, 60 Hz standard. The first and second pulleys 38 and 40, second drive shaft 36 and transmission shaft 44 are designed so as to not need greasing. Additionally, the drive belt 42 is fabricated from a material having a large thermal capacity to insure long, cool-running operation of the drive unit 30. The drive unit 30 is also provided with automatic tensioning of the drive belt 42 to insure the smooth transmission of power and prevent excess wear of the drive belt 42. Though not shown, the drive housing 32 is also preferably provided with full length cover plates on both sides thereof to provide easy access to the components therewithin. Though the variable speed drive unit 30 has been shown as incorporating a hand wheel 48 to facilitate the adjustment of the tool spindle speed, various other manual, electrical or pneumatic means may be utilized as an alternative to the manually actuated hand wheel 48.

In retrofitting the variable speed drive unit 30 to an existing Bridgeport Series One vertical milling machine, the V-belt 22 is removed from first stepped pulley 18 and the drive motor 14 and first stepped pulley 18 are removed from the pulley housing 12. The drive housing 32 of the variable speed drive unit 30 is then attached to the pulley housing 12 in a matter wherein the transmission shaft 44 extends downwardly into the pulley housing 12 in approximately the same orientation as the previous drive shaft 16 of the drive motor 14. When the transmission shaft 44 is oriented in this manner, the drive pulley 46 occupies a position within the pulley housing 12 substantially analogous to the position previously occupied by the uppermost one of the annular surfaces of the first stepped pulley 18. With the transmission shaft 44 and drive pulley 46 disposed in the aforementioned orientations, the drive housing 32 is secured to the pulley housing 12.

As seen in FIG. 3, the drive housing 32 preferably includes a flange member 50 formed on the lower surface thereof which includes extensions 52 adapted to receive fastening members such as screws. Importantly, the flange 50 is specifically sized and configured to be retrofittable to the opening (not shown) formed in the top of the pulley housing 12 due to the removal of the drive motor 14 therefrom. As such, the flange 50 and hence the variable speed drive unit 30 may be quickly and easily interfaced to the pulley housing 12. Once the drive unit 30 has been secured to the pulley housing 12 via the flange 50, the V-belt 22 is extended between the uppermost one of the annular surfaces defined by the second stepped pulley 20 and the drive pulley 46 thereby interconnecting these components. Due to this interconnection, rotation of the motor 34 will cause the rotation of the tool spindle 24 via the rotation of the shafts 36 and 44 and pulleys 38, 40, 46 and 20. As previously specified, the hand wheel 48 or other adjustment means allows for infinite adjustment of the rotational speed of the tool spindle 24 without any changes being made to the vertical positioning of the V-belts 22 and 42.

Additional modifications and improvements of the present invention may also be apparent to those skilled in the art. Thus, the particular combination of parts is described and illustrated herein is intended to represent only one embodiment of the invention, and is not intended to serve as limitations of alternative devices within the spirit and scope of the invention.

What is claimed is:

1. In a BRIDGEPORT SERIES ONE vertical milling machine having a pulley housing, a drive motor connected to said pulley housing, a drive shaft extending downwardly from said drive motor into said pulley housing, a first stepped pulley disposed within said pulley housing and attached to the distal end of said drive shaft, a second stepped pulley disposed within said pulley housing and attached to said first pulley via a V-belt, and a tool spindle extending downwardly from said second pulley out of said pulley housing, a method of retrofitting the milling machine with a variable speed drive comprising the steps of:

removing said drive motor and said first pulley from said pulley housing;

attaching a drive housing of the variable speed drive to the pulley housing in a manner wherein an output shaft of the variable speed drive extends downwardly from the drive housing into the pulley housing and a drive pulley attached to the output shaft is disposed within the pulley housing; and connecting the drive pulley to the second to pulley via the V-belt.

2. The method of claim 1 wherein said second stepped pulley defines four differently dimensioned annular surfaces, and said drive pulley is connected to the uppermost one of said annular surfaces via said V-belt.

3. The method of claim 1 further comprising the step of forming a flange upon the drive housing, said flange being sized and configured to be retrofittable to said pulley housing of said milling machine.

4. In a BRIDGEPORT SERIES ONE vertical milling machine having a pulley housing, a drive motor connected to said pulley housing, a drive shaft extending downwardly from said drive motor into said pulley housing, a first stepped pulley disposed within said pulley housing and attached to the distal end of said drive shaft, a second stepped pulley disposed within said pulley housing and attached to said first pulley via a V-belt, and a tool spindle extending downwardly from said second pulley out of said pulley housing, the improvement comprising:

a variable speed drive retrofit device attached to said pulley housing in a manner wherein an output shaft of said retrofit device extends downwardly from a drive housing of said retrofit device into said pulley housing and a drive pulley attached to the output shaft is disposed within said pulley housing and connected to the second pulley via the V-belt, said variable speed drive retrofit device facilitating the speed adjustment of the tool spindle without necessitating the repositioning of the V-belt upon the first and second stepped pulleys.

5. The device of claim 4 further comprising a flange member formed on said drive housing, said flange member being sized and configured to be retrofittable to said pulley housing of said milling machine.

* * * * *